(12) United States Patent
Kim et al.

(10) Patent No.: US 12,731,811 B2
(45) Date of Patent: Sep. 8, 2026

(54) BATTERY MODULE INCLUDING FOLDABLE SIDE PLATE AND METHOD FOR MANUFACTURING SAME

(71) Applicant: LG Chem, Ltd., Seoul (KR)

(72) Inventors: Kyung-Mo Kim, Daejeon (KR); Jin-Yong Park, Daejeon (KR); Ho-June Chi, Daejeon (KR); Seung-Joon Kim, Daejeon (KR); Jeong-O Mun, Daejeon (KR); Hee-Jun Jin, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1101 days.

(21) Appl. No.: 16/972,053

(22) PCT Filed: Dec. 18, 2019

(86) PCT No.: PCT/KR2019/017942
§ 371 (c)(1),
(2) Date: Dec. 4, 2020

(87) PCT Pub. No.: WO2020/145539
PCT Pub. Date: Jul. 16, 2020

(65) Prior Publication Data

US 2021/0336287 A1 Oct. 28, 2021

(30) Foreign Application Priority Data

Jan. 8, 2019 (KR) ........................ 10-2019-0002468

(51) Int. Cl.
*H01M 50/50* (2021.01)
*H01M 10/04* (2006.01)
(Continued)

(52) U.S. Cl.
CPC ..... *H01M 10/0468* (2013.01); *H01M 50/211* (2021.01); *H01M 50/262* (2021.01);
(Continued)

(58) Field of Classification Search
CPC .. H01M 50/50; H01M 50/296; H01M 50/262; H01M 50/211; H01M 50/507;
(Continued)

(56) References Cited

U.S. PATENT DOCUMENTS 9,812,693 B2 11/2017 DeKeuster et al.
2001/0002298 A1* 5/2001 Leung ............... H01M 10/0413 429/163
(Continued)

FOREIGN PATENT DOCUMENTS

CN 105706273 A 6/2016
CN 205429084 U 8/2016
(Continued)

OTHER PUBLICATIONS

Search Report for European Application No. 19908412.0 dated Sep. 24, 2021. 2 pgs.
(Continued)

*Primary Examiner* — Osei K Amponsah
(74) *Attorney, Agent, or Firm* — Lerner David LLP

(57) ABSTRACT

A battery module includes a first module and a second module, each including a cell stack having a plurality of battery cells stacked vertically and a bus bar frame assembly configured to cover a front surface and a rear surface of the cell stack; and a pair of foldable side plates including a first side plate configured to cover and pressurize one side surface and another side surface of the first module and a second side plate configured to cover and pressurize one side surface and another side surface of the second module and coupled to the first side plate by a hinge.

9 Claims, 9 Drawing Sheets

(51) Int. Cl.

| | |
|---|---|
| ***H01M 50/211*** | (2021.01) |
| ***H01M 50/262*** | (2021.01) |
| ***H01M 50/296*** | (2021.01) |
| ***H01M 50/507*** | (2021.01) |
| *H01M 50/178* | (2021.01) |
| *H01M 50/289* | (2021.01) |
| *H01M 50/548* | (2021.01) |

(52) U.S. Cl.

CPC ......... *H01M 50/296* (2021.01); *H01M 50/50* (2021.01); *H01M 50/507* (2021.01); *H01M 50/178* (2021.01); *H01M 50/289* (2021.01); *H01M 50/548* (2021.01); *H01M 2220/20* (2013.01)

(58) Field of Classification Search

CPC ............. H01M 50/548; H01M 50/289; H01M 50/178; H01M 10/0468

See application file for complete search history.

(56) References Cited

U.S. PATENT DOCUMENTS

2007/0020516 A1* 1/2007 Yoon .................. H01M 50/209 429/153
2009/0305116 A1 12/2009 Yang et al.
2011/0027630 A1* 2/2011 Tsutsumi .......... H01M 10/0459 429/153
2013/0244069 A1* 9/2013 Horii ................. H01M 10/6571 429/90
2016/0126531 A1 5/2016 Kim et al.
2016/0133890 A1* 5/2016 Lee ..................... H01M 50/503 429/151
2016/0268658 A1 9/2016 Kong et al.
2020/0303694 A1 9/2020 Koh

FOREIGN PATENT DOCUMENTS

| | | | |
|---|---|---|---|
| CN | 207097973 | U | 3/2018 |
| CN | 109075277 | A | 12/2018 |
| EP | 2410590 | A2 | 1/2012 |
| JP | 200135462 | A | 2/2001 |
| JP | 2008544441 | A | 12/2008 |
| JP | 2009529217 | A | 8/2009 |
| JP | 2011134540 | A | 7/2011 |
| JP | 2015057759 | A | 3/2015 |
| JP | 2017076546 | A | 4/2017 |
| KR | 20070011654 | A | 1/2007 |
| KR | 20130008136 | A | 1/2013 |
| KR | 20130081027 | A | 7/2013 |
| KR | 20170035218 | A | 3/2017 |
| KR | 20180031204 | A | 3/2018 |
| WO | 2018124751 | A1 | 7/2018 |

OTHER PUBLICATIONS

International Search Report for Application No. PCT/KR2019/017942, mailed Apr. 3, 2020, pp. 1-3.

Chinese Search Report for Application No. 202010017915.9 dated Dec. 3, 2020, 3 pages.

* cited by examiner

BATTERY MODULE INCLUDING FOLDABLE SIDE PLATE AND METHOD FOR MANUFACTURING SAME

CROSS-REFERENCE TO RELATED APPLICATIONS

The present application is a national phase entry under 35 U.S.C. § 371 of International Application No. PCT/KR2019/017942, filed Dec. 18, 2019, published in Korean, which claims priority from Korean Patent Application No. 10-2019-0002468 filed Jan. 8, 2019 in the Republic of Korea, all of which are incorporated herein by reference.

TECHNICAL FIELD

The present disclosure relates to a battery module including a foldable side plate, and a battery pack and a vehicle including the battery module. More specifically, the present disclosure relates to a battery module having a structure in which an electrode lead and a bus bar are welded to each other in a state where a pair of unit modules are pressed simultaneously by using a pair of foldable side plates connecting the pair of unit modules and then the foldable side plates are unfolded so that the pair of unit modules are disposed side by side in a longitudinal direction, and a battery pack and a vehicle including the battery module.

BACKGROUND ART

Conventionally, when manufacturing a long module by arranging a pair of unit modules, in each of which a cell stack and a bus bar frame are coupled, side by side in a longitudinal direction, surface pressurization is performed to each cell stack individually in order to perform a welding process between an electrode lead and a bus bar for each unit module.

That is, a welding process is performed for coupling the electrode lead and the bus bar in a state where surface pressurization applied to the cell stack pressure is maintained for one unit module, and then the same process is performed for another unit module to make a pair of unit modules. After that, in a state where two unit modules are arranged side by side in the longitudinal direction, a housing is assembled or welded thereto.

However, if this conventional process is used, surface pressurization is inevitably applied to and released from each unit module repeatedly, which causes relative movement between the electrode lead and the bus bar. As a result, stress is accumulated in the electrode lead and the welded portion between the electrode lead and the bus bar.

In addition, the accumulated stress may lead to a product failure due to breakage of a part or damage to the welded portion while a product is being produced or used.

Thus, when manufacturing a battery module of a long module type having a structure in which a pair of unit modules are arranged side by side in the longitudinal direction, it is necessary to continuously maintain the surface pressurization state for the unit modules without repeatedly applying surface pressurization to the unit modules and releasing the surface pressurization. Also, it is demanded to develop a battery module having a structure capable of maintaining the surface pressurization state.

DISCLOSURE

Technical Problem

The present disclosure is designed to solve the problems of the related art, and therefore the present disclosure is directed to continuously maintaining a surface pressurization state for unit modules without repeatedly applying surface pressurization to the unit modules and releasing the surface pressurization, when manufacturing a battery module of a long module type having a structure in which a pair of unit modules are arranged side by side in the longitudinal direction.

However, the technical problem to be solved by the present disclosure is not limited to the above, and other objects not mentioned herein will be understood from the following description by those skilled in the art.

Technical Solution

In one aspect of the present disclosure, there is provided a battery module, comprising: a first module and a second module, each including a cell stack having a plurality of battery cells stacked vertically and a bus bar frame assembly configured to cover a front surface and a rear surface of the cell stack; and a pair of foldable side plates including a first side plate configured to cover and pressurize one side surface and another side surface of the first module and a second side plate configured to cover and pressurize one side surface and another side surface of the second module and coupled to the first side plate by a hinge.

In the foldable side plates, the first side plate and the second side plate may rotate relative to each other with respect to the hinge between a folded condition in which the first side plate and the second side plate are arranged side by side in a width direction and an unfolded condition in which the first side plate and the second side plate are arranged side by side in a longitudinal direction.

The first module and the second module may be arranged side by side in the width direction when the foldable side plates are in the folded condition, and the first module and the second module may be arranged side by side in the longitudinal direction when the foldable side plates are in the unfolded condition.

The bus bar frame assembly may include a front bus bar frame configured to cover a front surface of the cell stack; and a rear bus bar frame configured to cover a rear surface of the cell stack.

The first side plate and the second side plate may extend in a direction toward the front bus bar frame from the rear bus bar frame and have a length to extend further than the front bus bar frame.

The front bus bar frame may include a pair of module terminals electrically connected to the first module and a pair of module terminals electrically connected to the second module.

When the pair of foldable side plates are in the unfolded condition, the pair of module terminals provided to the first module and the pair of module terminals provided to the second module may face each other.

The battery module may further comprise an upper housing and a lower housing coupled to the pair of foldable side plates to cover upper surfaces and lower surfaces of the first module and the second module when the pair of foldable side plates are in the unfolded condition to maintain pressure to the first module and the second module.

The battery module may further comprise a pair of end plates coupled to rear surfaces of the first module and the second module, respectively.

In another aspect of the present disclosure, there are also provided a battery pack and a vehicle, comprising the battery module according to an embodiment of the present disclosure.

Meanwhile, in another aspect of the present disclosure, there are also provided a method for manufacturing a battery module, comprising: a cell stack arranging step of providing a pair of battery cell stacks to be arranged side by side in a width direction of the battery cell stacks; a pressurization initiating step of pressing both sides of the pair of battery cell stacks in the width direction by using a pair of foldable side plates in a folded state; a module forming step of forming a first module and a second module, respectively equipped with one of the pair of cell stacks and a bus bar frame assembly, by coupling the bus bar frame assemblies to cover a front surface and a rear surface of each of the cell stacks while maintaining pressurization to the cell stack; an unfolding step of unfolding the foldable side plates while maintaining pressurization to the cell stacks so that the first module and the second module are arranged side by side in a longitudinal direction; a housing coupling step of coupling an upper housing and a lower housing configured to cover upper surfaces and lower surfaces of the first module and the second module to the foldable side plates by welding while maintaining pressurization to the cell stacks; and an end plate coupling step of coupling a pair of end plates to cover rear surfaces of the first module and the second module.

Advantageous Effects

According to an embodiment of the present disclosure, a surface pressurization state for unit modules may be continuously maintained without repeatedly applying surface pressurization to the unit modules and releasing the surface pressurization, when manufacturing a battery module of a long module type having a structure in which a pair of unit modules are arranged side by side in the longitudinal direction. Also, it is possible to prevent stress from being accumulated in the electrode lead and the welded portion between the electrode lead and the bus bar

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
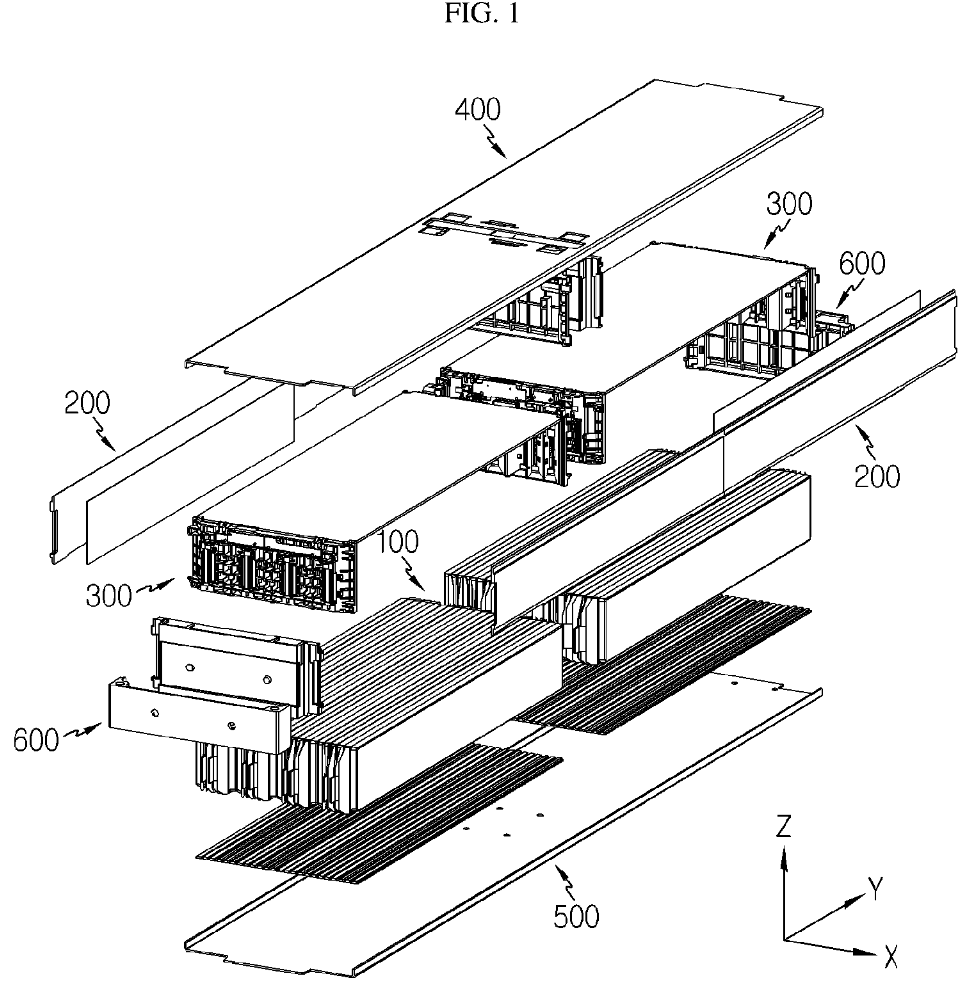
FIG. 1 is an exploded perspective view showing a battery module according to an embodiment of the present disclosure.

First, referring to FIG. 1, a battery module according to an embodiment of the present disclosure may be implemented to include a cell stack 100, a pair of foldable side plates 200, a pair of bus bar frame assemblies 300, an upper housing 400, a lower housing 500 and an end plate 600.

Figure 2:
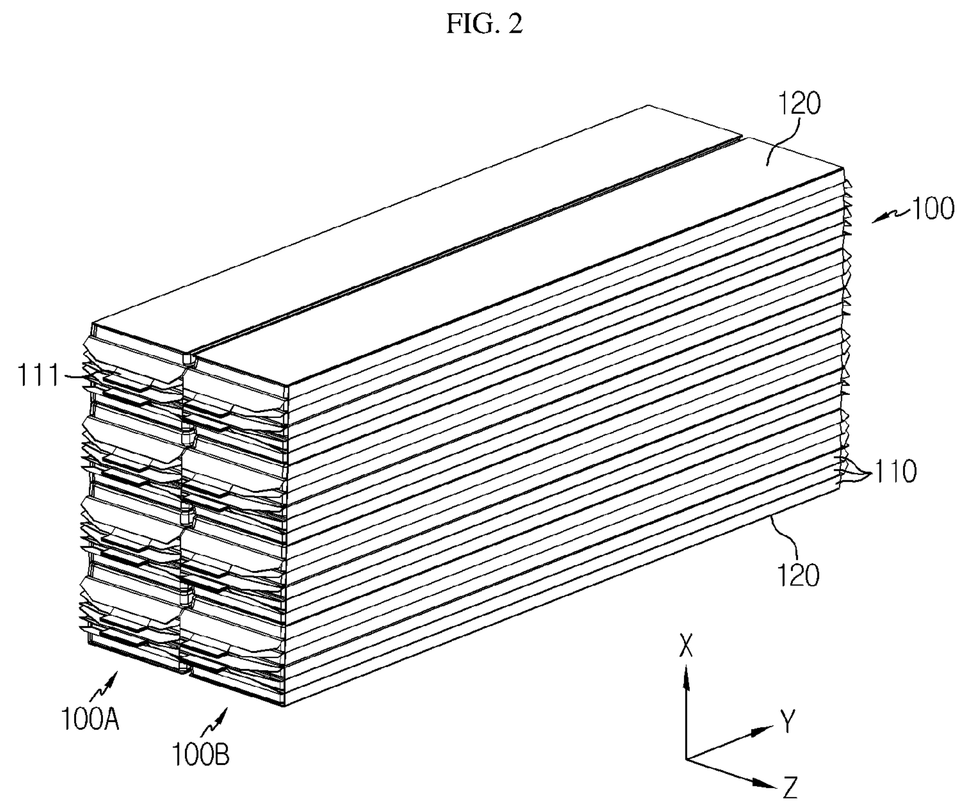
FIG. 2 is a perspective view showing a cell stack.

Referring to FIG. 2, the cell stack 100 includes a plurality of battery cells 110 stacked in a vertical direction (a direction parallel to an X axis of FIG. 2) and a plurality of buffering pads 120 disposed between neighboring battery cells 110 or on an outer side surface of a battery cell 110 disposed at an outermost side.

The battery cell 110 may be, for example, a pouch-type battery cell. If the pouch-type battery cell is used as the battery cell 110, electrode leads 111 are provided at one side and the other side of the battery cell 110 in the longitudinal direction, respectively. The electrode lead 111 is a thin metal plate connected to an electrode tab formed at an electrode assembly (not shown) that is disposed inside the battery cell 110, namely inside a pouch case, and is drawn out of the pouch case.

The buffering pad 120 is interposed at the outer side of the cell stack 100 and/or between neighboring battery cells 110 to allow the cell stack 100 to contract when both surfaces of the cell stack 100 are pressed. In order to enable contraction of the cell stack 100 as described above, the buffering pad 120 is preferably made of an elastic material such as a sponge.

The cell stack 100 is coupled to the bus bar frame assembly 300 in a state where both sides thereof are pressurized by the foldable side plates 200, and is also coupled by welding the foldable side plates 200 and the housings 400, 500 in a state of maintaining the pressurization force. That is, inside the completed battery module, the buffering pad 120 is in a contracted state, thereby suppressing the generation of swelling caused by repeated use of the battery module, by means of the elastic energy stored therein.

As shown in FIG. 2, the cell stack 100 includes a first cell stack 100A and a second cell stack 100B arranged side by side in a width direction of the cell stack 100 (a direction parallel to the Z axis of FIG. 2). The first cell stack 100A and the second cell stack 100B are arranged side by side in the width direction as described above when the foldable side plates 200 are in a folded state, as explained later. If the foldable side plates 200 are in an unfolded state, the first cell stack 100A and the second cell stack 100B are arranged side by side along the longitudinal direction (a direction parallel to the Y axis of FIG. 2).

Figure 3:
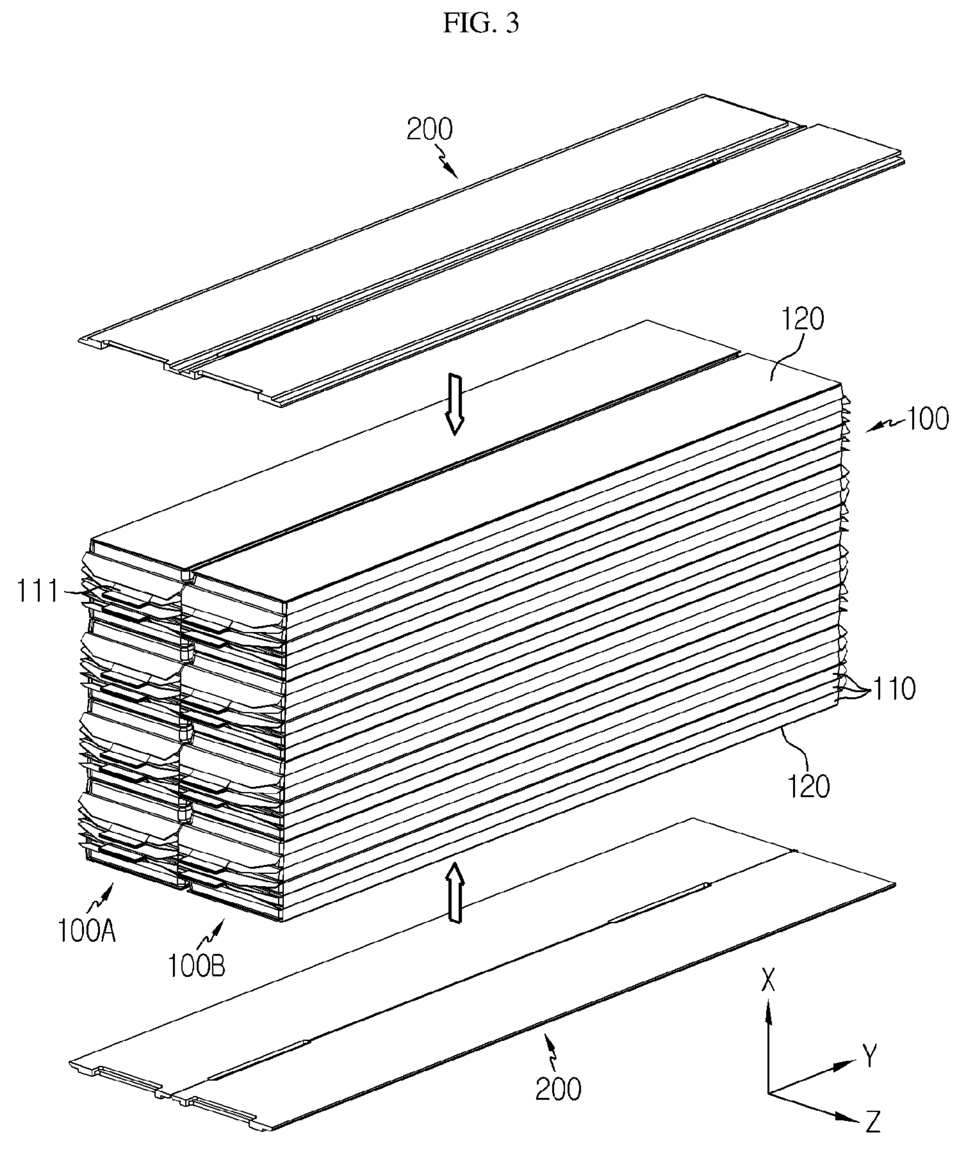
FIG. 3 is an exploded perspective view showing a cell stack and a foldable side plate.

Referring to FIG. 3, the foldable side plate 200 is provided in a pair, and the foldable side plates 200 are respectively attached to one side surface and the other side surface of the first cell stack 100A and the second cell stack 100B arranged side by side in the width direction (a direction parallel to the Z axis of FIG. 3). The foldable side plates 200 press the cell stack 100 to contract.

Namely, the foldable side plates 200 are disposed to cover one side and the other side of the cell stack 100 by coupling with the upper housing 400 and the lower housing 500, explained later, and also serve to press the cell stack 100.

Figure 4:
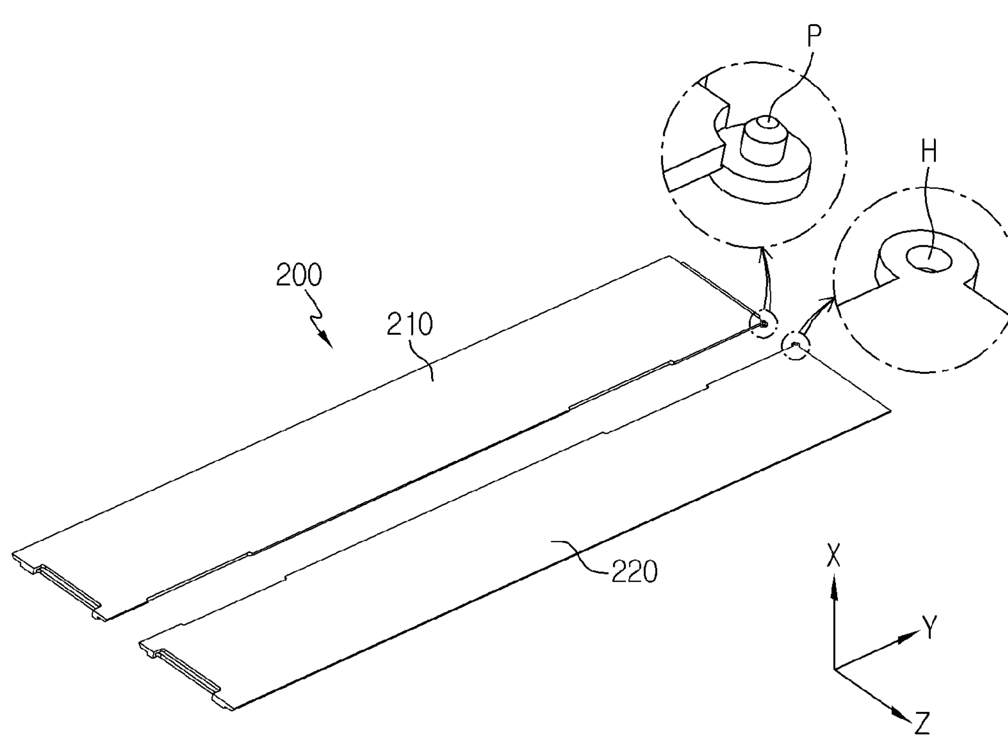
FIG. 4 is an exploded perspective view and a partially enlarged view showing the foldable side plate.
Figure 5:
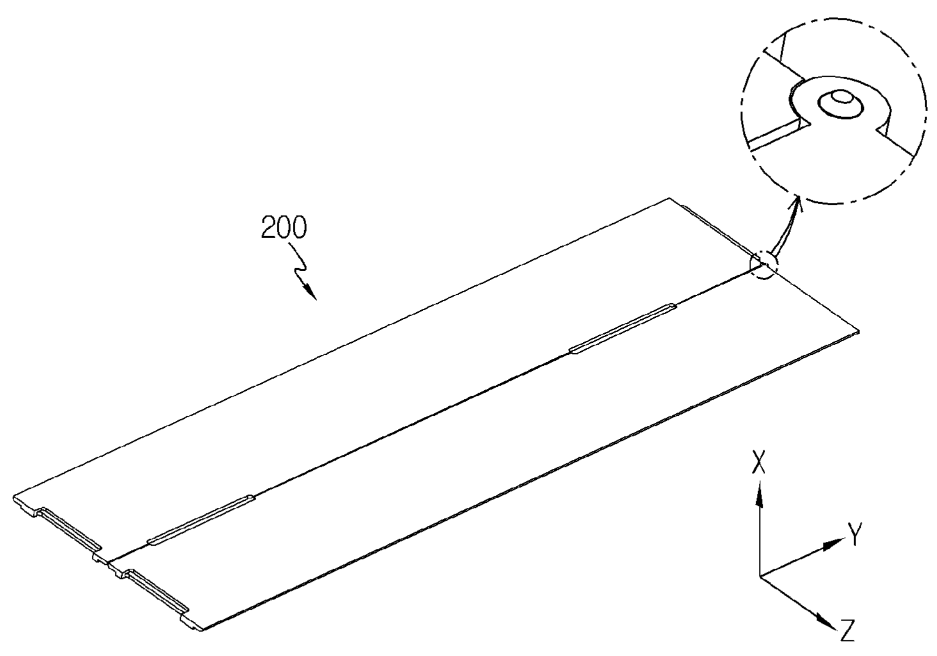
FIG. 5 is a diagram showing that the foldable side plate is in a folded state.
Figure 6:
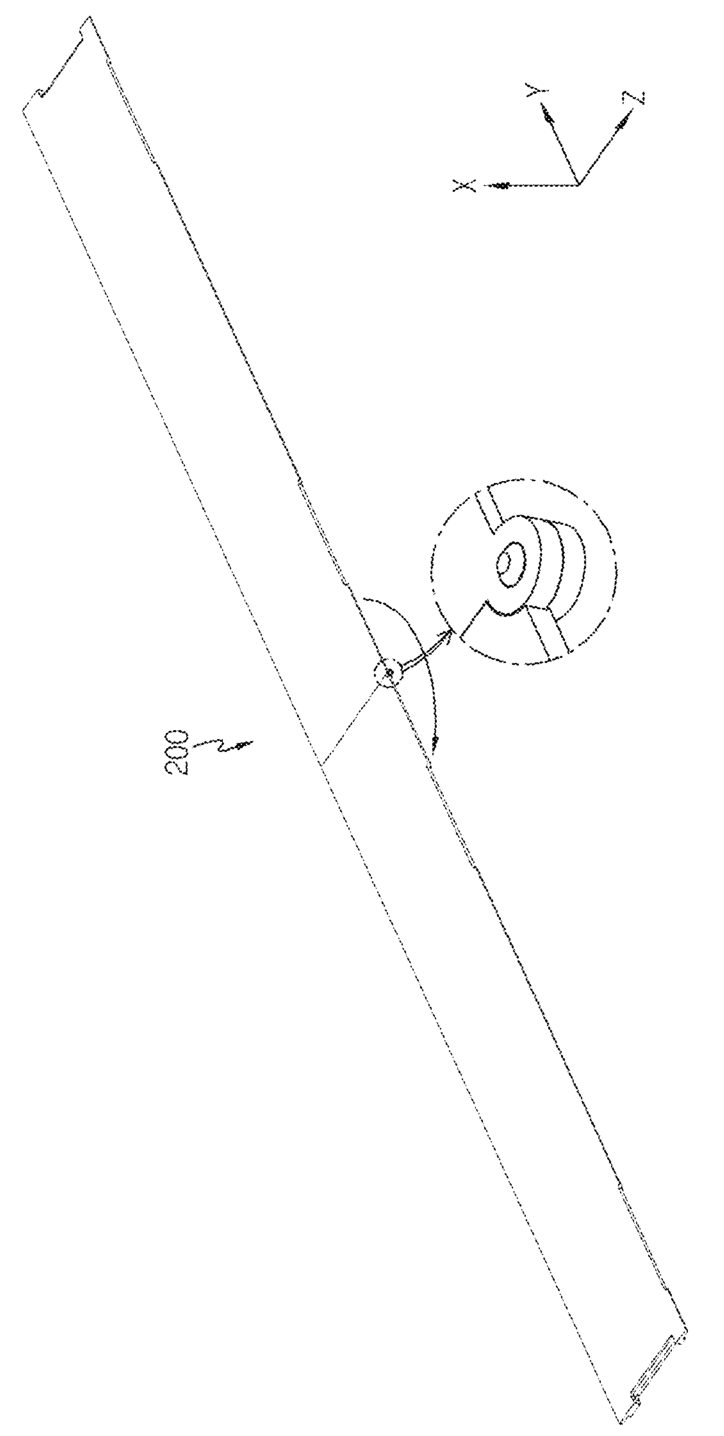
FIG. 6 is a diagram showing that the foldable side plate in an unfolded state.

Referring to FIGS. 4 to 6, the foldable side plates 200 include a first side plate 210 and a second side plate 220 which are hinged to allow relative rotation with each other. By the hinge coupling, as shown in FIG. 5, the pair of side plates 210, 220 may be folded so as to be arranged side by side in the width direction (a direction parallel to the Z axis of FIG. 5), and, as shown in FIG. 6, the pair of side plates 210, 220 may be unfolded so as to be arranged side by side in the longitudinal direction (a direction parallel to the Y axis of FIG. 6).

Referring to FIG. 4, the hinge coupling between the first side plate 210 and the second side plate 220 may be performed by, for example, fastening between a coupling hole H formed in a corner region at one longitudinal end of the first side plate 210 and a coupling protrusion P formed in a corner region of one longitudinal end of the second side plate 220. In addition, it is also possible that the coupling hole H is formed at the second side plate 220 and the coupling protrusion P is formed at the first side plate 210.

Referring to FIGS. 5 and 6 along with FIG. 3, the first side plate 210 covers one side surface and the other side surface of the first cell stack 100A (a surface parallel to the Y-Z plane of FIG. 3). Similarly, the second side plate 220 covers one side surface and the other side surface of the second cell stack 100B (a surface parallel to the Y-Z plane of FIG. 3).

Figure 7:
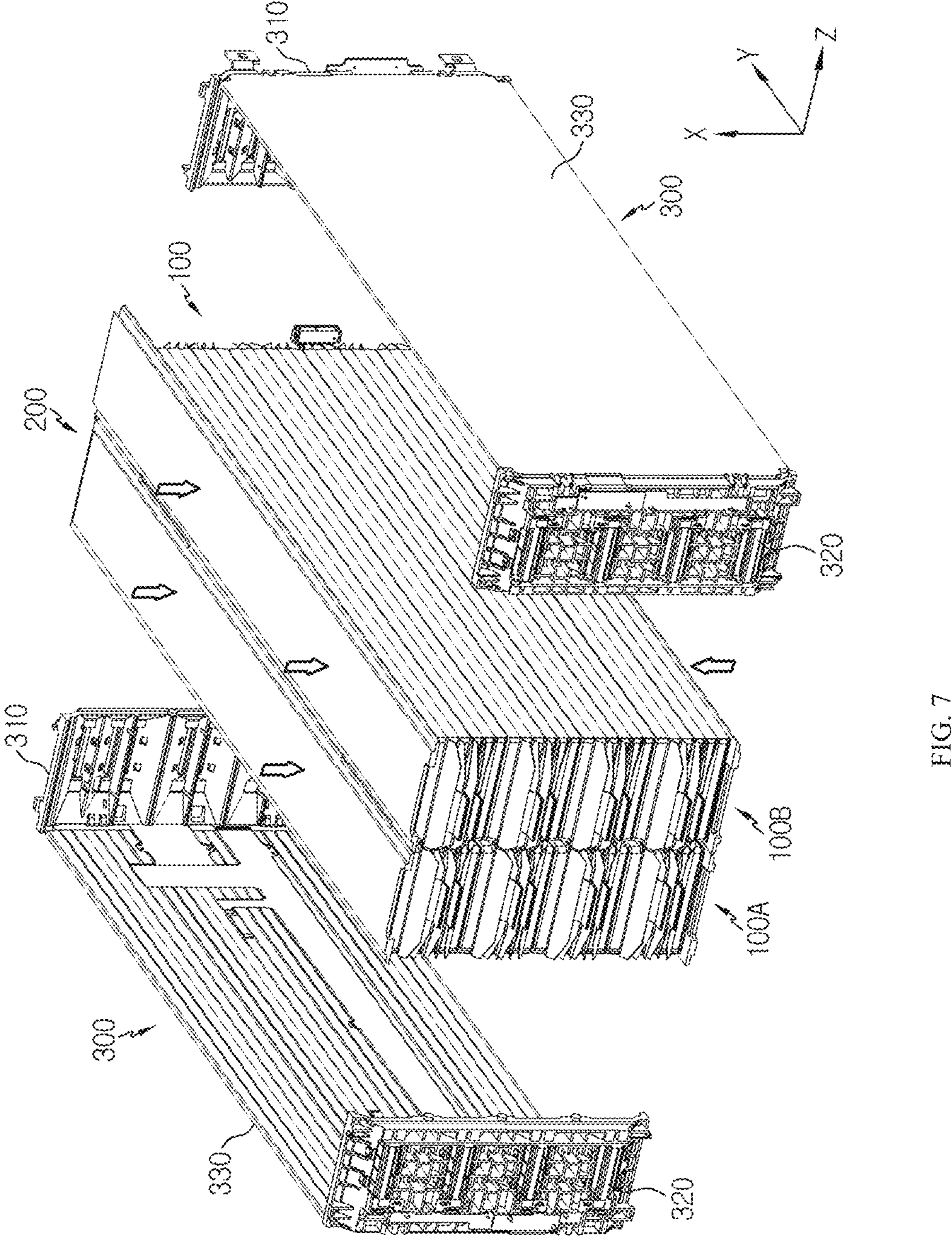
FIGS. 7 to 9 are diagrams for illustrating that surface pressurization to the cell stack is maintained from process of coupling a bus bar frame assembly to the cell stack to a process of unfolding the foldable side plate so that a pair of unit modules are arranged side by side in a longitudinal direction.
Figure 8:
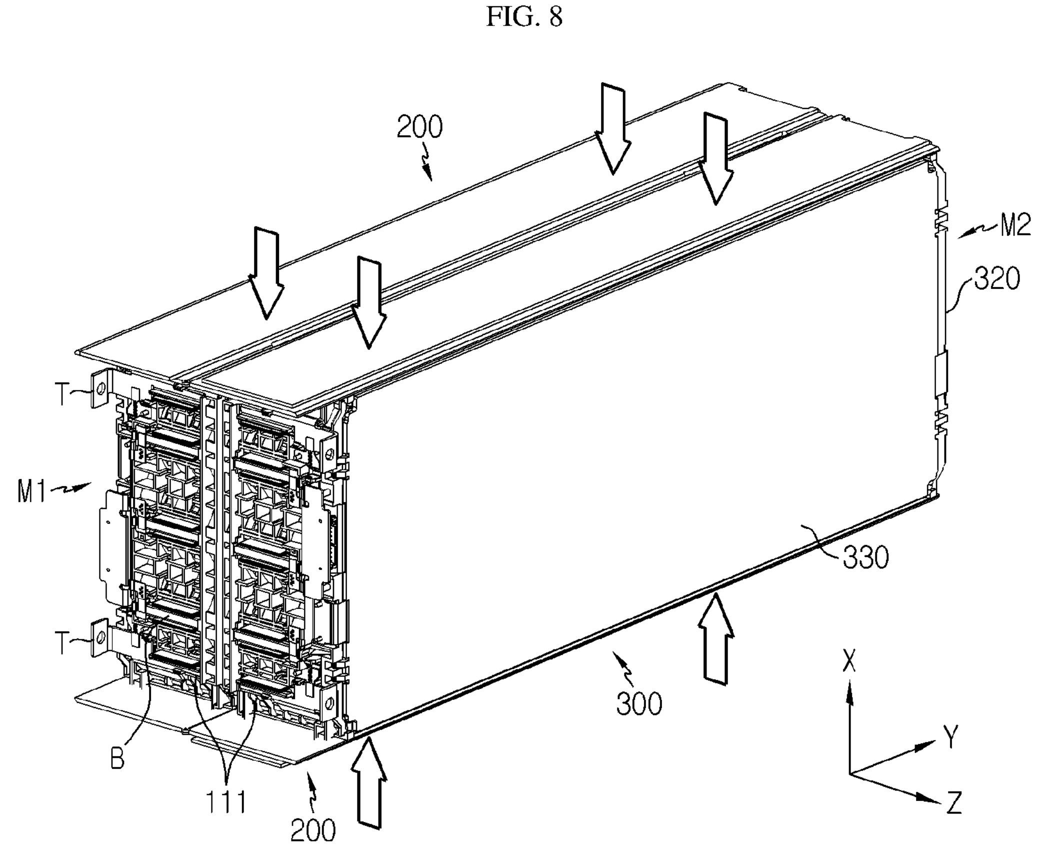

Referring to FIGS. 7 and 8, the bus bar frame assembly 300 is provided in a pair, each bus bar frame assembly 300 includes a front bus bar frame 310, a rear bus bar frame 320 and a cover plate 330. The front bus bar frame 310, the rear bus bar frame 320 and the cover plate 330 are made of a material with electrical insulation such as resin.

In a state where the cell stack 100 is pressed by the foldable side plates 200 in an arrow direction, the pair of bus bar frame assemblies 300 are coupled to cover the front surface and the rear surface (surfaces parallel to the X-Z plane of FIGS. 7 and 8) and the upper surface (a surface plane parallel to the X-Y plane of FIGS. 7 and 8) of the first cell stack 100A and the second cell stack 100B.

The pair of front bus bar frames 310 are coupled to cover the front surfaces of the first cell stack 100A and the second cell stack 100B, respectively, and the pair of rear bus bar frames 320 are coupled to cover the rear surfaces of the first cell stack 100A and the second cell stack 100B, respectively. In addition, the pair of cover plates 330 are coupled to cover the upper surfaces of the first cell stack 100A and the second cell stack 100B, respectively. Both longitudinal ends of the cover plate 330 may be hinged to the front bus bar frame 310 and the rear bus bar frame 320, respectively, so that the front bus bar frame 310 and the rear bus bar frame 320 may rotate relative to the cover plate 330.

Due to the hinge coupling structure between the bus bar frames 310, 320 and the cover plate 330, after the cover plate 330 is placed at a predetermined position on the upper surface of the cell stacks 100A, 100B, the bus bar frames 310, 320 may be rotated to accurately cover rotate the front surfaces and the rear surfaces of the cell stacks 100A, 100B.

A plurality of bus bars B are provided on the bus bar frames 310, 320 in its longitudinal direction (a direction parallel to the X axis of FIGS. 7 and 8), and the bus bars B are coupled to electrode leads 111 drawn out through slits formed at the bus bar frames 310, 320 by welding. The electrode leads 111 of two or more battery cells 110 to be electrically connected to each other may be coupled to one bus bar B.

In addition, a pair of module terminals T are provided on the front bus bar frame 310, and the pair of module terminals T are coupled to the electrode leads 111 of the battery cell 110 located at an outermost side along a width direction (a direction parallel to the X axis of FIGS. 7 and 8) of the cell stacks 100A, 100B. In the present disclosure, the front bus bar frame 310 and the rear bus bar frame 320 are distinguished depending on whether the module terminal T is provided or not. That is, in the present disclosure, a bus bar frame at which the module terminal T is formed is defined as the front bus bar frame 310, and a bus bar frame at which the module terminal T is not formed is defined as the rear bus bar frame 320.

Meanwhile, the welding between the electrode lead 111 and the bus bar B and the welding between the electrode lead 111 and the module terminal T are performed in a state where the pressurization by the foldable side plates 200 is maintained, and also are performed in a state where the pair of cell stacks 100A, 100B are arranged adjacently side by side in the width direction since the foldable side plates 200 are folded.

As the pair of bus bar frame assemblies 300 are coupled, a first module M1 including the first cell stack 100A, the first side plate 210 and the bus bar frame assembly 300 and a second module M2 including the second cell stack 100B, the second side plate 220 and the bus bar frame assembly 300 are provided.

Figure 9:
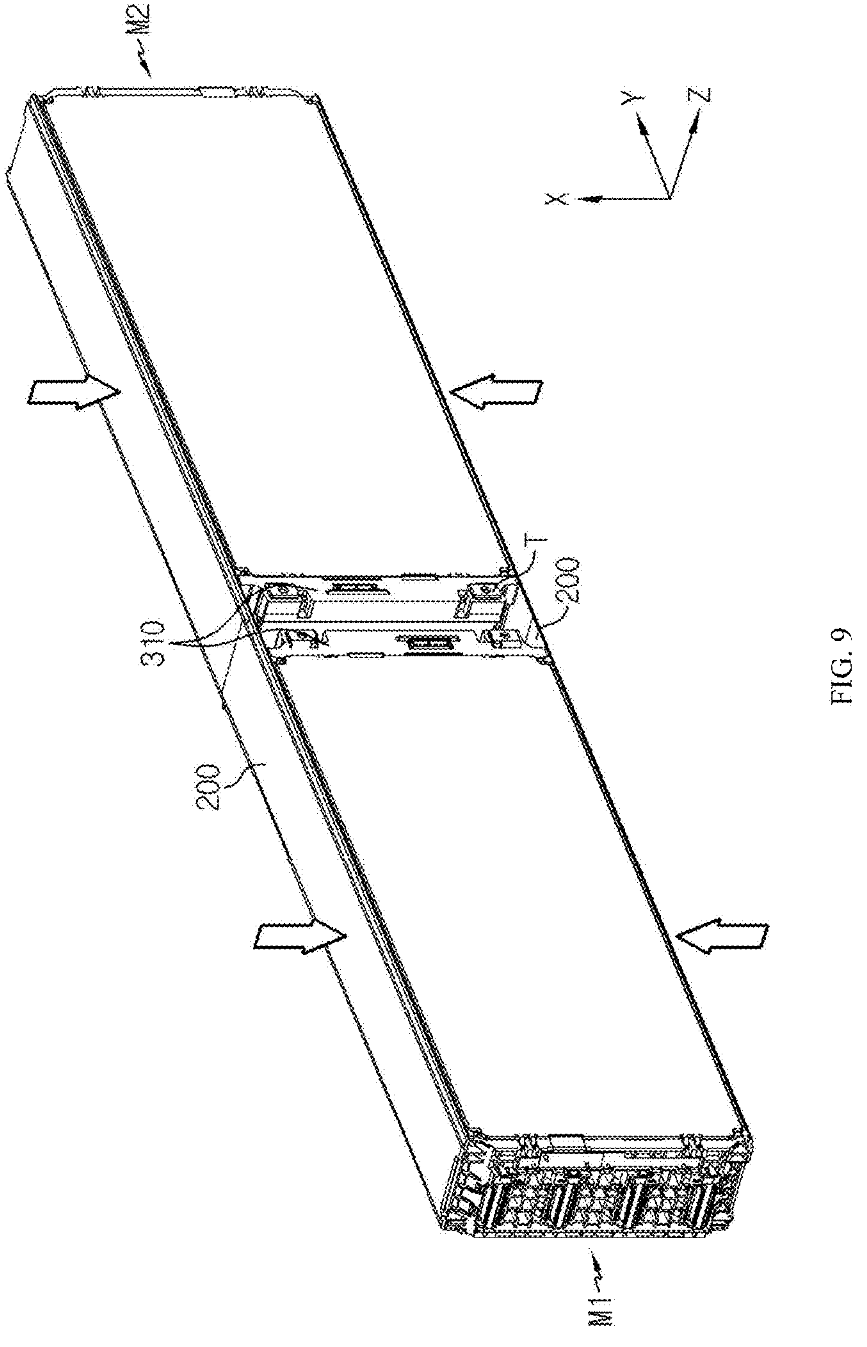

Referring to FIGS. 8 and 9, the first side plate 210 and the second side plate 220 of the foldable side plates 200 extend in a direction toward the front bus bar frame 310 from the rear bus bar frame 320 and have a length extending further to the front bus bar frame 320. In addition, the first side plate 210 and the second side plate 220 are hinged to each other at a position corresponding to the front bus bar frame 310, among both longitudinal ends thereof.

By doing so, when the foldable side plates 200 are unfolded, the first module M1 and the second module M2 are adjacently arranged side by side in the longitudinal direction (a direction parallel to the Y axis of FIG. 9) in a state where the front bus bar frames 310 thereof face each other. Accordingly, the pair of module terminals T provided to the first module M1 and the pair of module terminals T provided to the second module M2 face each other.

Meanwhile, even when the foldable side plates 200 are unfolded so that the pair of modules M1, M2 are adjacently arranged side by side in the longitudinal direction, the pressurization to the cell stack 100 by the foldable side plates 200 is maintained.

Figure 10:
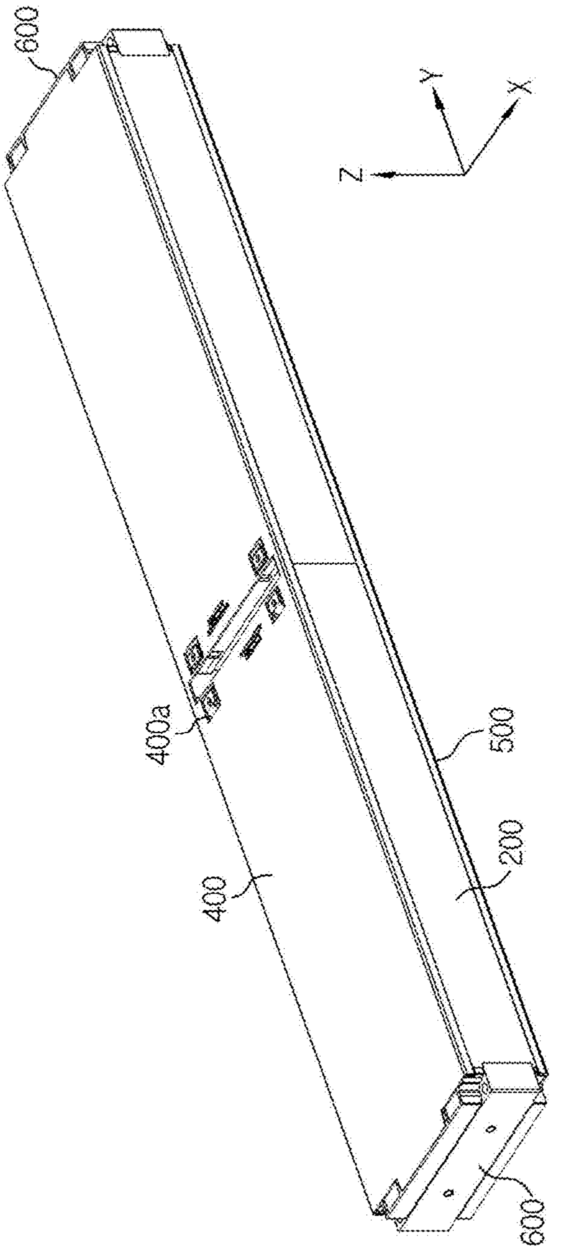
FIG. 10 is a perspective view showing an assembled battery module according to an embodiment of the present disclosure.

Referring to FIG. 10, the upper housing 400 and the lower housing 500 cover the upper surfaces and the lower surfaces (surfaces parallel to the X-Y plane of FIG. 10) of the first module M1 and the second module M2, respectively, in a state where the pair of foldable side plates 200 are unfolded while maintaining the pressurization to the first module M1 and the second module M2.

Both edges of the upper housing 400 and the lower housing 500 in the width direction (a direction parallel to the X axis of FIG. 10) are coupled to both edges of the foldable side plate 200 in the width direction (a surface parallel to the Y-Z plane of FIG. 10) by welding. The coupling between the housings 400, 500 and the foldable side plates 200 by welding is performed in a state where the cell stack 100 keeps pressed by the foldable side plates 200.

As shown in FIG. 10, the end plate 600 is provided in a pair, and the pair of end plates 600 cover with the front surface and the rear surface of the battery module according to an embodiment of the present disclosure (surfaces parallel to the X-Z plane of FIG. 10), respectively. That is, the pair of end plates 600 are coupled to the rear surfaces of the first module M1 and the second module M2, respectively.

As described above, the battery module according to an embodiment of the present disclosure has a structure capable of performing a following process while continuously maintaining a state where the pair of modules M1, M2 are pressed using the foldable side plates 200.

Specifically, in the battery module, by applying the foldable side plates 200, as shown in FIG. 8, the pair of modules M1, M2 may be easily pressurized in a state of being adjacently arranged side by side in the width direction, and the electrode lead 111 and the bus bar B may be welded smoothly. In case of a battery module to which the foldable side plate 200 is not applied, similar to that shown in FIG. 9, after the pair of modules are arranged adjacent to each other along the longitudinal direction, the electrode lead and the bus bar must be welded in a state where both sides of the pair of modules are pressed using the side plates. However, in this case, due to a very narrow space between the modules, welding may not be performed smoothly at the front surface of the module. In addition, if the pair of modules are arranged side by side in the longitudinal direction and the side plates are attached thereto after the welding process is individually performed to each of the pair of modules, it is not possible to continuously pressurize the modules.

In the battery module structure according to an embodiment of the present disclosure, however, welding is performed in a state where the foldable side plates 200 are folded, while maintaining the pressurization to the modules M1, M2 by the foldable side plates 200. Also, since the housings 400, 500 are folded in a state where the foldable side plates 200 are unfolded, it is possible to ensure easy welding and maintain continuous pressurization during in the process.

A method for manufacturing the battery module according to an embodiment of the present disclosure includes (S1) a cell stack arranging step; (S2) a pressurization initiating step; (S3) a module forming step; (S4) an unfolding step; (S5) a housing coupling step; and (S6) an end plate coupling step.

In the cell stack arranging step (S1), a pair of battery cell stacks 100A, 100B are provided to be arranged side by side in the width direction of the battery cell stacks 100A, 100B. In the pressurization initiating step (S2), both sides of the pair of battery cell stacks 100A, 100B in the width direction are pressurized using a pair of foldable side plates 200 in a folded state.

In the module forming step (S3), in a state where the pressurization to the cell stacks 100A, 100B initiated in the pressurization initiating step (S2) is maintained, bus bar frame assemblies 300 are coupled to cover front surfaces and rear surfaces of the cell stacks 100A, 100B, respectively, to form a first module M1 and a second module M2, each including the cell stack 100 and the bus bar frame assembly 300. In the unfolding step (S4), in a state where the pressurization to the cell stack 100 performed in the module forming step (S3) is maintained, the foldable side plates 200 are unfolded so that the first module M1 and the second module M2 are arranged side by side in the longitudinal direction.

In the housing coupling step (S5), in a state where the pressurization to the cell stack 100 performed in the unfolding step (S4) maintained, an upper housing 400 and a lower housing 500 covering the upper surfaces and the lower surfaces of the first module M1 and the second module M2 are coupled to the foldable side plates 200 by welding. In the end plate coupling step (S6), a pair of end plates 600 covering rear surfaces of the first module M1 and the second module M2 are coupled. The steps S1 to S6 are performed in order.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

100: cell stack
100A: first stack
100B: second stack
110: battery cell
120: buffering pad
111: electrode lead
200: foldable side plate
210: first side plate
H: coupling hole
220: second side plate
P: coupling protrusion
300: bus bar frame assembly
310: front bus bar frame
320: rear bus bar frame
B: bus bar
T: module terminal
M1: first module
M2: second module
330: cover plate
400: upper housing
410: terminal exposing portion
500: lower housing
600: end plate

What is claimed is:

1. A battery module, comprising:

a first module and a second module, each including a cell stack having a plurality of battery cells stacked vertically and a bus bar frame assembly configured to cover a front surface and a rear surface of the cell stack;

a pair of foldable side plates including a first side plate configured to cover and pressurize one side surface and another side surface of the first module and a second side plate configured to cover and pressurize one side surface and another side surface of the second module and coupled to the first side plate by a hinge to rotate between a folded condition and a unfolded condition, the first module and the second module being arranged side by side in a width direction in the folded condition, the first module and the second module being arranged side by side in a longitudinal direction in the unfolded condition; and an upper housing coupled to each of the pair of foldable side plates to cover upper surfaces of the first module and the second module, wherein the foldable side plates are configured to form an external enclosure around the cell stacks and maintain a continuous pressurization force across the cell stacks during a transition from the folded condition to the unfolded condition, the pressurization force acting along a direction parallel to the upper housing.

2. The battery module according to claim 1, wherein the bus bar frame assembly includes:

a front bus bar frame configured to cover a front surface of the cell stack; and a rear bus bar frame configured to cover a rear surface of the cell stack.

3. The battery module according to claim 2, wherein the first side plate and the second side plate extend in a direction toward the front bus bar frame from the rear bus bar frame and have a length to extend further than the front bus bar frame.

4. The battery module according to claim 2, wherein the front bus bar frame includes a pair of module terminals electrically connected to the first module and a pair of module terminals electrically connected to the second module.

5. The battery module according to claim 4, wherein when the pair of side plates in the unfolded condition, the pair of module terminals provided to the first module and the pair of module terminals provided to the second module face each other.

6. The battery module according to claim 5, further comprising:

a lower housing, the lower housing and the upper housing coupled to the pair of side plates to cover upper surfaces and lower surfaces of the first module and the second module when the pair of side plates are in the unfolded condition to maintain pressure to the first module and the second module.

7. The battery module according to claim 6, further comprising:

a pair of end plates coupled to rear surfaces of the first module and the second module, respectively.

8. A battery pack, comprising the battery module according to claim 1.

9. A vehicle, comprising the battery module according to claim 1.

* * * * *